UNITED STATES PATENT OFFICE.

CHARLES HERSCHEL KOYL, OF NEW YORK, N. Y.

PROCESS OF PURIFYING WATER.

SPECIFICATION forming part of Letters Patent No. 653,008, dated July 3, 1900.

Application filed November 1, 1899. Serial No. 735,517. (No specimens.)

*To all whom it may concern:*

Be it known that I, CHARLES HERSCHEL KOYL, a citizen of the United States, and a resident of New York city, in the county and State of New York, have invented a certain new and useful Process for the Purification of Water, of which the following is a specification.

For the purpose of purifying water and in aid of the filtering process to which the water may be subjected it has been customary for many years to dissolve in such water prior to its filtration an aluminum salt, such as sulphate of aluminum. The action of the water and the matters with which it may be impregnated is to decompose the aluminum sulphate, the result of the decomposition being

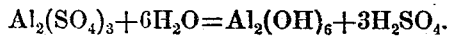
$$Al_2(SO_4)_3 + 6H_2O = Al_2(OH)_6 + 3H_2SO_4.$$

In other words, the products of decomposition are aluminum hydrate and sulphuric acid. The former is a very flocculent precipitate which acts as a coagulent and materially aids the filter through which the water is subsequently passed in its cleansing action. The latter—sulphuric acid—remains in solution in the water and is harmful when the water is used in steam-boilers or for washing purposes, &c. A very objectionable feature in this reaction also is that the decomposition of the aluminum sulphate is so slow that very much of it does not take place until after the water has passed through the filter. With a view to remedy these difficulties it has been the practice to treat the water not only with the aluminum salt, but also with lime—as described, for example, in British Letters Patent to Frederick Arthur Paget, No. 3,613, of 1874—to the end that all the aluminum salt may be surely and quickly converted into aluminum hydrate by the chemical action of the hydrated lime and that at the same time the acid may be neutralized by combining with the calcium. This process has been in use for a number of years and has been measurably successful. The disadvantage attending it is that the acid which combines with the calcium forms calcium sulphate, which remains in solution in the water. This calcium sulphate is, as is well known, a scale-forming material, and its presence unfits the water for some industrial uses, such as its use in steam-boilers, for washing, &c. I remark also that instead of the aluminum sulphate salts of other metals, such as iron, which will yield a flocculent precipitate have been used.

It is the object of my invention to efficiently produce a flocculent precipitate without the concomitant formation of substances which will injure the boiler in which or the fabrics on which the treated water may be subsequently used and without the production of water-hardening or scale-forming compounds.

To this end my invention essentially consists in the employment, in the manner hereinafter described, of sodium hydroxide in connection with a salt, such as ferrous sulphate or sulphate of aluminum, which will yield a gelatinous precipitate when mixed with water. Ferrous sulphate is the ingredient I prefer for the purification of water for steam purposes; but in the treatment of waters for bleaching, for laundry purposes, &c., where the faintest trace of iron would be apt to do damage, I use sulphate of aluminum. These substances are employed in proper proportions, their combining weight being in proportion of about seven of the ferrous sulphate to two of sodium hydroxide, and in the treatment of the water to be purified the sodium hydroxide is mixed with the water first and the ferrous sulphate afterward. The result is that I obtain almost instantly precipitation of the gelatinous precipitate in an efficiently-flocculent state and in solution in the water sodic sulphate, which is neutral, tasteless, harmless, and free from objectionable characteristics.

The flocculency or cleansing power of a precipitate or its efficiency as a coagulant depends largely upon the rapidity with which the precipitation is completed. Such a salt as ferrous sulphate or sulphate of aluminum when added to almost any kind of water will be slowly decomposed by the action of the impurities already in the water, so that there will be slowly produced from the ferrous sulphate a gelatinous precipitate. What I have discovered is that if the water be previously prepared by having intimately mixed with it a definite amount of active alkali, such as sodium hydroxide, this precipitation will be completed almost instantaneously upon the addition of the ferrous sulphate to the thus prepared water, and the precipitate consequently will be flocculent. In other words, my process of water purification involves the two steps of first preparing the water by thoroughly mixing sodium hydroxide with it and then adding a salt from which may be produced a gelatinous precipitate, which latter when produced by the union of the salt and the water prepared as first above described will also be a flocculent precipitate and efficient for the purpose of cleansing the water. Such salt, as above said, may be ferrous sulphate or sulphate of aluminum, preferably the former.

The combining weight of the ingredients is in the proportion of about seven to two, or, more accurately speaking, two hundred and seventy-eight pounds of ferrous sulphate to eighty pounds of sodium hydroxide. It is preferable to dissolve each before introducing them into the water. They should not meet except in the water to be purified. The quantity of these ingredients required will vary according to the quality and characteristics of the water to be purified. Generally speaking, I take, say, one grain of ferrous sulphate (and of course a proportional weight of sodium hydroxide) to one gallon of raw water.

The mixing can be effected in various ways in various forms of apparatus, as will be understood without further explanation. One convenient form of apparatus for the purpose is described and illustrated in my companion application of even date herewith, Serial No. 735,518.

What I claim, and desire to secure by Letters Patent, is—

The process of treating water for purposes of purification which consists in first preparing the water by intimately mixing with it sodium hydroxide and then adding to the thus-prepared water ferrous sulphate, substantially as and for the purposes hereinbefore set forth.

In testimony whereof I have hereunto set my hand this 31st day of October, 1899.

CHARLES HERSCHEL KOYL.

Witnesses:
JOHN HILL MORGAN,
PHILIP EARL DUDLEY.